FIG. 3-A

United States Patent Office 3,541,333
Patented Nov. 17, 1970

3,541,333
SYSTEM FOR ENHANCING FINE DETAIL IN THERMAL PHOTOGRAPHS
Winser E. Alexander, Bedford, Mass., assignor to the United States of America as represented by the Secretary of the Air Force
Filed Dec. 10, 1968, Ser. No. 785,035
Int. Cl. G01t 1/16
U.S. Cl. 250—83.3                                3 Claims

ABSTRACT OF THE DISCLOSURE

A thermal photograph enhancement system including a scanning type detector, a system for converting radiant energy to electrical energy, and an electrical circuit wherein an input signal is compared with a previous signal and the difference is used for enhancement purposes in a scanning glow tube-film output combination.

BACKGROUND OF THE INVENTION

This invention relates generally to the enhancement of the fine detail in thermal photographs and more particularly to a system for electronically processing signals from a thermal radiation detector whereby the fine detail is enhanced in the presence of large radiance on a real time basis.

A substantial increase in time and attention has been paid to the celestial bodies that surround our sun and information is required about these bodies in order that we may determine more about the history of the universe as well as information relating to man and the possibility of man making a soft landing and exploring the planets. Some information is gathered by the use of space probes, however this is a very expensive process and the results are limited by time and distance. Another method of gathering information particularly useful for closer planets and celestial satellites is the telescope. The earth's moon, for example, has been extensively photographed and observed by the light gathering telescope.

Recently the moon has been observed and studied by utilizing the infrared radiation emanating and reflecting from its surface. Generally this is done by utilizing a conventional light gathering telescope and inserting an infrared detector in its focal plane. The detector may be a scanning type, having a scanning raster and connected to an x–y scanning device that will plot the infrared intensity or perhaps a glow tube that scans and whose intensity varies with the intensity of the received radiation. The glow tube would scan a photographic film in conjunction with the scanning detector and the intensity of the beam would vary proportionally to the intensity of infrared radiation received by the detector.

One manner in which changes in infrared radiation are detected by telescopic observation is where an optical system is placed in the focal plane of the telescope, and having two mirrors, one coated and one uncoated, two observations are made in rapid succession, one using each mirror. The change in radiation as seen by the attenuation caused by the coating is given preference over the absolute value. This method, however, is an optical mechanical system which is slow and provides no reference radiation signal.

Alternatively, a system has been disclosed wherein a standard black body reference is used and the signal detector "looks" first to the target radiation and then to the standard, this alternating sequence is continued and it is possible after long periods of observation and by utilizing specialized equipment to determine changes in thermal radiation. The disadvantages to this system is that the overall change between standard reference and the target radiation is generally of such a magnitude, particularly when observing celestial bodies, that relatively small changes in thermal intensity cannot be observed. That is, in the case of a glow tube system the dynamic range of available photographic film is small and the small changes in radiation are lost in the overall changes in radiation.

It can then be seen that there is an important need for a system which will enhance the fine detail of thermal photographs where the thermal radiance is large and the changes are relatively small and to do this on a real time basis by simplified electronic processing.

SUMMARY OF THE INVENTION

The primary object of this invention is to provide a thermal enhancement method and the apparatus therefor, which will detect, discriminate, and more effectively display differences in infrared radiation, such that there is an apparent increase in resolution and an increase in the effective dynamic range of the infrared observation system.

The invention to be disclosed hereinafter involves the processing of an electrical signal obtained from a thermal detector located in the focal plane of a light gathering telescope. The signal is processed such that so-called target signatures of a chosen size will be emphasized with respect to all other target signatures. The processing is accomplished by taking a delayed difference of the original signal. The original signal is delayed and attenuated by a constant factor and subtracted from itself to obtain a first difference. The process may be repeated on the first difference to obtain a second difference and hence obtain further enhancement if desired.

The difference approximates a combination of the original signal with its first derivative over a large portion of the useable range. By varying the time delay and the attenuation factor, targets of a selected size may be emphasized to a desired degree.

The enhancement is due to the relative reduction of the background information. Since the new information is obtained due to this reduction of the background, the effective dynamic range of the system is increased.

It is therefore an object of this invention to provide a new and improved system for enhancing the fine detail in a thermal radiation detection system.

It is a further object of this invention to provide a new and improved image enhancement system which operates on a real time basis.

It is another object of this invention to provide a new and improved image enhancement system wherein the image enhancement is done by electronic processing.

It is still a further object of the invention to provide a new and improved thermal detector system which has an increased effective dynamic range over any similar device hitherto known.

DESCRIPTION OF THE DRAWINGS

FIG. 3A is a radiation profile curve of a system using this invention.

DESCRIPTION OF THE PREFERRED EMBODIMENT

Figure 1:
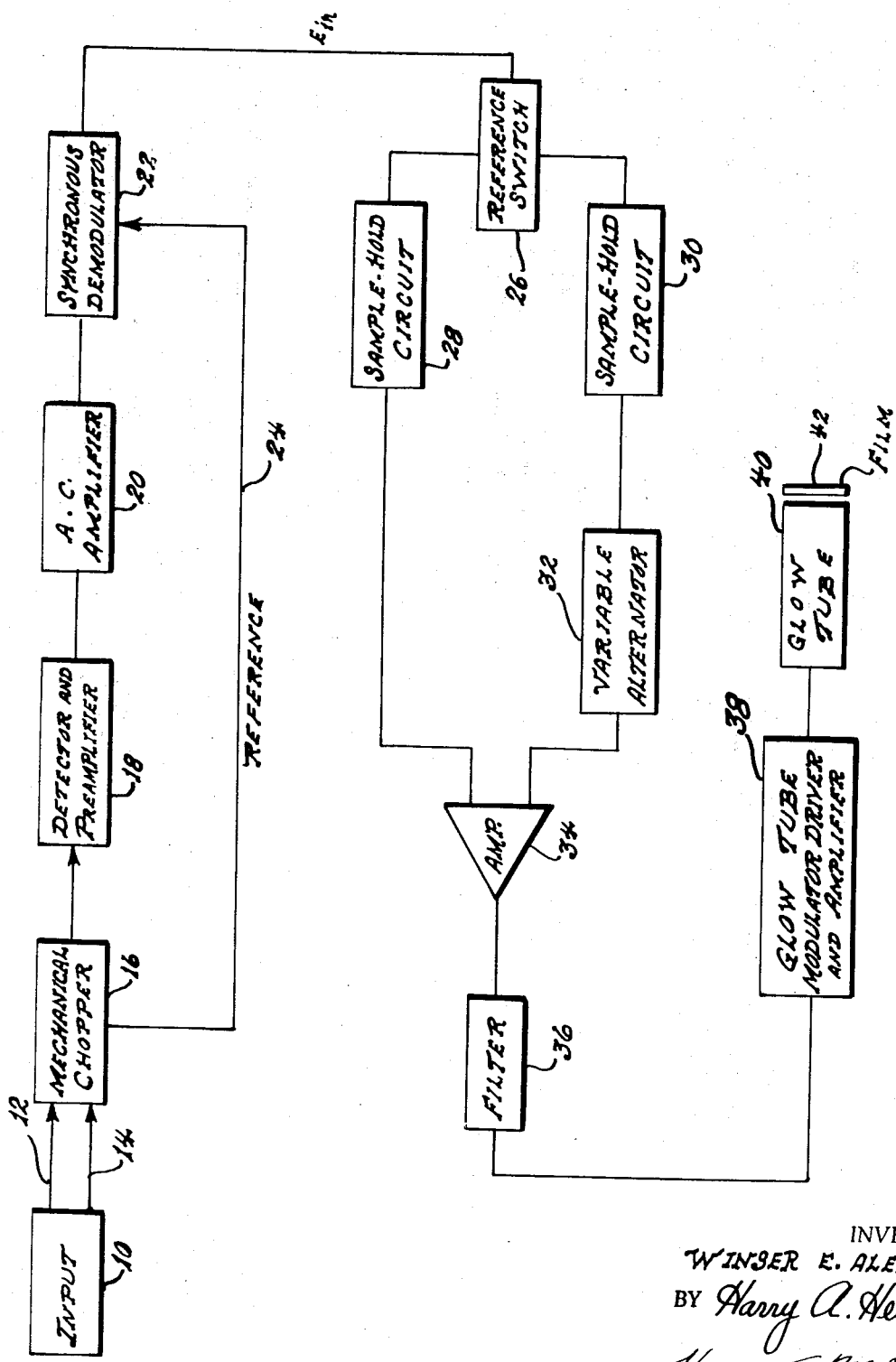
FIG. 1 is a block diagram of the system included in this invention.

Referring now to FIG. 1, the input 10 receives radiation from a standard block body source and the object being studied. The signals pass from the detector through lines 12 and 14 to a mechanical chopper 16 where the signals are separated or chopped and then combined and sent to the detector and preamplifier 18 where an electrical signal is formed which is proportional to the radiation input. The signal is then amplified by the A.C. amplifier 20 and fed to the synchronous demodulator 22 which is a phase sensitive switch giving a D.C. output proportional to the phase and magnitude of the input signal. A standard reference signal is fed into 22 via line 24 and a signal is then formed proportional to the difference between the standard and target radiation.

The output of the synchronous demodulator is then fed to a reference switch 26 which is operated at a preselected rate in order to emphasize targets of a particular or desired size. The signals thus go to a pair of sample hold circuits 28 and 30 which will be described with regard to FIG. 2. In the sample hold circuits two signals are formed, one is the original signal as formed in the detector and preamplifier 18 and the other is the signal as it was at some preselected time.

Sample hold circuit 30 has a serially connected variable attenuator 32 which determines the preference given to the changes in the radiation level over the background radiation level. The two signals are then fed to a difference amplifier 34 wherein an output signal is formed which is a combination of the original input signal and the changes or variation in the input. The output of the amplifier approximates the original signal and its first derivative. The filter 36 removes any high frequency noise included in the signal applied to the synchronous demodulator 22. The glow tube modulator 38 converts the signal into usable electrical energy whereby the glow tube 40 will scan across the film 42 and vary in intensity proportional to the output of 38.

Figure 2:
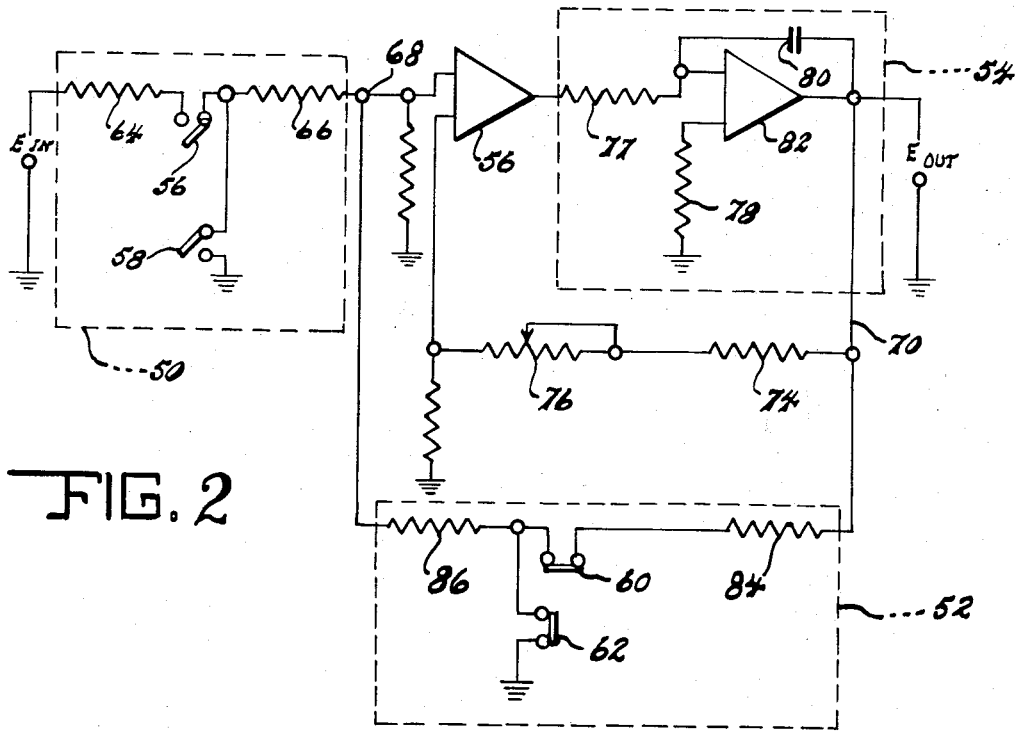
FIG. 2 is a diagram of the sample hold circuit of the invention.

FIG. 2, the sample hold circuit (shown in FIG. 1 as blocks 28 and 30) is shown in detail, also included is the reference switch 26. The circuit is broken down into three major components shown in the boxes labeled 50, 52, and 54. Boxes 50 and 52 contain the reference switch 26, while box 54 contains an amplifier-integrator. The remaining unit, 56, is a difference amplifier which will be utilized as explained hereinafter.

The input signal voltage $E_{in}$ enters the circuit through the reference switch 50 which alternately opens and closes with reference switch 52. The switching rate is variable dependent on the size and degree of enhancement required.

Taking first the case where reference switch 50 is closed and reference switch 52 is open, that is, switches 56 and 62 are closed and switches 58 and 60 are open, the input signal ($E_{in}$) goes through matching resistors 64 and 66 and is then fed past point 68 to the differential amplifier 56. Simultaneously, a signal ($E_{out}$) from the amplifier integrator 54 goes through line 70 through matching resistors 74 and 76 (variable) to the differential amplifier 56. The signal will not reach point 68 since switch 52 is in the open condition. The input signal $E_{in}$ and the output signal $E_{out}$ both enter the differential amplifier 56 where a difference signal is formed. This output is taken through the amplifier-integrator circuit which consists of resistors 77 and 78, capacitor 80 and amplifier 82 where the output signal $E_{out}$ is formed. The output signal is proportional in amplitude to the input signal.

Now taking the circuit where reference switch 50 is open and reference switch 52 closed in the manner shown in the drawing, the input ($E_{in}$) cannot enter past the switch 50. The output ($E_{out}$) follows line 70, through resistors 74 and 76 to differential amplifier 56. The output further goes to switch 52, which is now closed, through matching resistors 84 and 86 to point 68 where it then enters the differential amplifier 56. The two signals now entering the amplifier are the same so that the difference is zero and hence the voltage output from the integrator will not change.

The outstanding advantage of this circuit is seen at the very instant reference switches change from a condition where switch 52 is open, and switch 50 closed to a condition where switch 52 is closed and switch 50 open, the output ($E_{out}$) becomes what the input ($E_{in}$) was when the switch arrangement was reversed. The net result of this arrangement is that the change in intensity of the incoming radiation is now measured from some previous signal and not from a standard source and hence the overall differences will be smaller thereby allowing greater amplification and therefore greater enhancement in the system.

It should be noted for the sake of clarity that the block diagram of FIG. 1 shows two sample hold circuits 28 and 30 and a reference switch 26, these three boxes are included in the circuit of FIG. 2.

Figure 3:
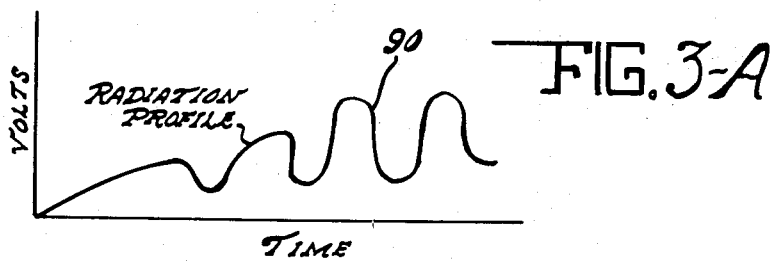
FIG. 3 is a radiation profile curve of a prior art system without the invention included.
Figure 3:
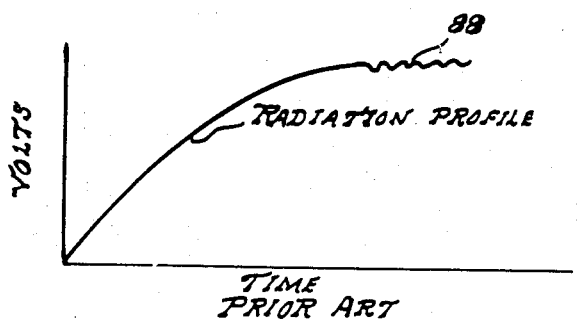

In FIG. 3 is shown a prior art curve 88 which is a radiation profile of the input radiation at the output of the system. FIG. 3A shows a radiation profile of the input radiation at the output using the image enhancement system of this invention. The upper end of the curve is of extreme interest since this is where the slight variations in intensity occurs and these variations, if they can be detected, are what provide the enhancement in thermal photographs. The curve in FIG. 3A shows how the variations are enlarged to a point where it is practical to use them in a thermal photographic system. Generally due to the limited dynamic range of film, small changes in radiation are lost in the over-all changes in radiation.

Although the invention has been described with reference to a particular embodiment, it will be understood to those skilled in the art that the invention is capable of a variety of alternative embodiments within the spirit and scope of the appended claims.

I claim:
1. A system for enhancing the fine detail in thermal photographs comprising: means for detecting radiation; detector means for converting radiant energy to electrical energy; a plurality of holding circuits connected to said energy converting means; difference amplifier means connected to the holding circuits whereby a signal is obtained having a direct relationship to the difference between the signal voltages in the hold circuits and a glow tube that varies in intensity proportional to the difference voltage.

2. A system for enhancing thermal photographs according to claim 1 wherein the detector is a scanning detector and the glow tube is a scanning tube.

3. A system for enhancing thermal photographs according to claim 1 wherein the holding circuits include a difference amplifier, having a first detector signal input and alternately an output feedback input and second an output feedback signal, and an amplifier-integrator for processing the signals.

References Cited
UNITED STATES PATENTS 3,479,515  11/1969  Snavely _____ 250—83.3
3,487,215  12/1969  Hunt _____ 250—83.3

RICHARD A. FARLEY, Primary Examiner
W. T. RIFKIN, Assistant Examiner

U.S. Cl. X.R.
250—65